H. SCHLAICH.
MEANS FOR INTRODUCING TEMPERATURE RESPONSIVE ELEMENTS INTO ENGINE COOLING SYSTEMS.
APPLICATION FILED APR. 28, 1919.

1,366,894.

Patented Jan. 25, 1921.
2 SHEETS—SHEET 1.

INVENTOR
Herman Schlaich
BY
Edmund Quincy Moses ATTORNEY

H. SCHLAICH.
MEANS FOR INTRODUCING TEMPERATURE RESPONSIVE ELEMENTS INTO ENGINE COOLING SYSTEMS.
APPLICATION FILED APR. 28, 1919.
1,366,894.
Patented Jan. 25, 1921.
2 SHEETS—SHEET 2.
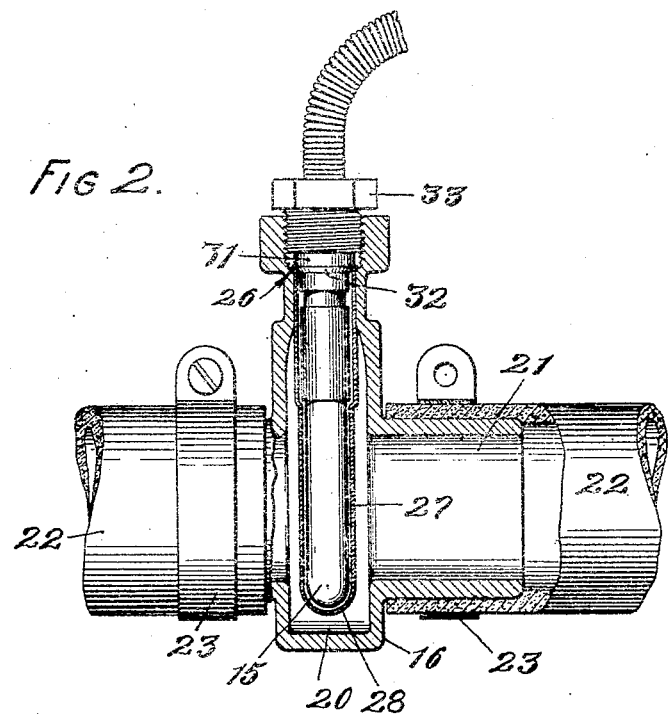
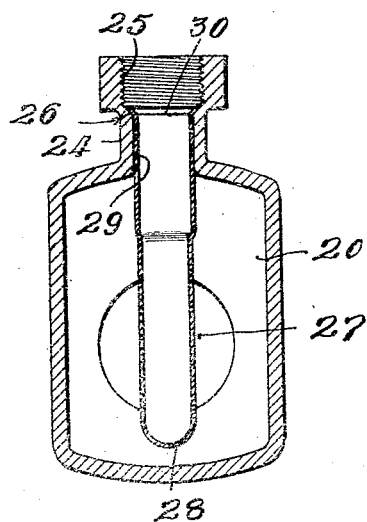
INVENTOR
Herman Schlaich
BY
ATTORNEY

UNITED STATES PATENT OFFICE.

HERMAN SCHLAICH, OF BROOKLYN, NEW YORK.

MEANS FOR INTRODUCING TEMPERATURE-RESPONSIVE ELEMENTS INTO ENGINE-COOLING SYSTEMS.

1,366,894.   Specification of Letters Patent.   Patented Jan. 25, 1921.

Application filed April 28, 1919.   Serial No. 293,267.

*To all whom it may concern:*

Be it known that I, HERMAN SCHLAICH, a citizen of Germany, (having declared his intention of becoming a citizen of the United States,) residing in the borough of Brooklyn, city of New York, county of Kings, State of New York, have invented certain new and useful Improvements in Means for Introducing Temperature - Responsive Elements into Engine - Cooling Systems, of which the following is a specification.

This invention relates to means for mounting temperature-responsive elements in connection with the cooling systems of internal combustion engines of automobiles or the like in such a way that the element shall be affected by the temperature of the cooling fluid. The invention is particularly applicable to the mounting of the temperature-responsive elements or bulbs of temperature indicating instruments in the cooling systems of the engines of aeroplanes, automobiles or other motor vehicles in accordance with the invention of patent to Boyce No. 1,206,783.

It is the principal object of the present invention to provide means for mounting the temperature responsive element in a convenient and effective manner in such a way that the temperature responsive element may be introduced or removed without danger of leakage from the cooling system.

In order to explain the nature of my invention and the manner in which the above and other objects are secured I have shown certain preferred embodiments of the invention as illustrative of the principle thereof and the best mode now known to me for practising the same.

In the accompanying drawings which form a part of this specification,

Fig. 2 is a detail side view partly in section showing a preferred construction embodying the invention;

Fig. 3 is a transverse section of the structure shown in Fig. 2, the temperature responsive element having been removed.

Figure 1:
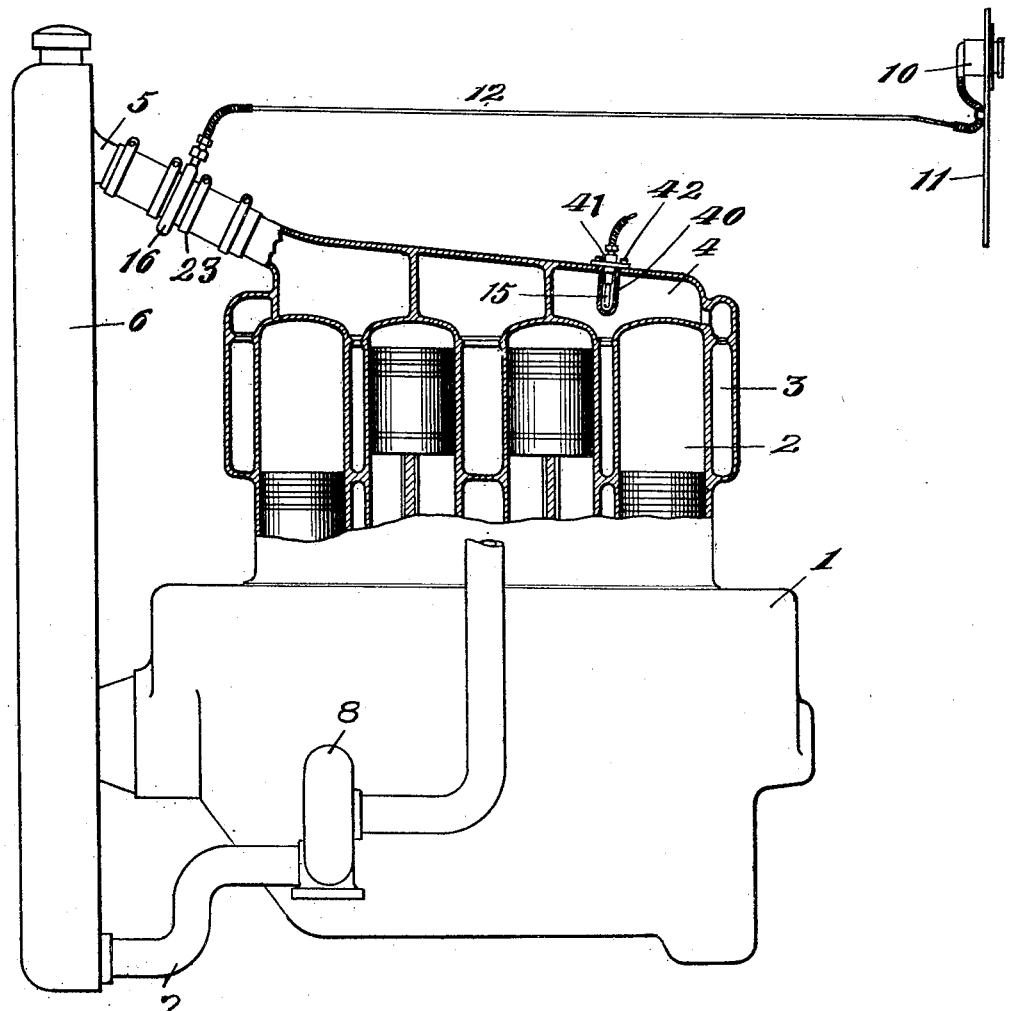
Figure 1 is a diagrammatic side elevation partly in section, showing an automobile engine and its cooling system, and illustrating two forms in which my invention may be applied in connection therewith.

Referring to the drawings in detail, the numeral 1 indicates an internal combustion engine of an automobile or other vehicle having the cylinders 2, the upper parts of which are inclosed by the water jackets 3 which communicate through the return manifold 4 and return pipe 5 with the radiator 6. The lower part of the radiator is connected by the inlet pipe 7 with the jacket space. A circulation may be produced in the cooling system described by means of the pump 8 or by thermo-siphon action or in any other suitable or well known manner. The water being heated by contact with the engine cylinders in which combustion takes place, passes to the upper part of the radiator, descends through the radiator, and is cooled during such descent, and the cooled water is then carried again into the water jackets through the connections described, where it again performs its cooling function.

As fully explained in the above-mentioned patent to Boyce No. 1,206,783, it is highly desirable for the operator of a motor vehicle to have means by which he may be kept informed of the thermal condition of the engine, said Boyce patent disclosing instrumentalities for such purpose comprising the use of a temperature-responsive element introduced into the cooling system in such a way as to be affected by the heated water in the system, said temperature responsive element being operatively connected with indicating instrumentalities in position for observation by the operator. In the present instance I have illustrated temperature indicating means of this character comprising a gage 10 of suitable construction mounted on the vehicle dash 11 in position to be observed by the driver of the vehicle while driving, and connected by means of a small tube 12 with a temperature responsive element in the form of a bulb containing an expansible fluid. In the preferred embodiment of my invention the bulb 15 shown in Fig. 2, is introduced into a fitting 16 which forms a part of the return pipe leading from the cylinder jackets to the radiator. This fitting, as particularly illustrated in Figs. 2 and 3, comprises a body portion 20 having projecting from each side thereof the tubular portion 21 which is preferably of the same diameter as the adjacent metallic section of the return pipe so that the fitting may be secured between the return pipe sections by means of the flexible hose sections 22 and the hose clamps 23. This construction permits of the fitting being introduced into the return pipe without cutting any of the metal parts or drilling any holes which might result in leakage. The body part of the fitting is provided with a neck 24 having an internally threaded, somewhat enlarged, bore 25, the bottom wall of which is preferably formed as a beveled seat 26. Mounted in the neck and extending into the body portion and preferably across the direct path of the cooling fluid through the fitting is a tubular casing or well 27, preferably formed as a thin drawn tube of copper or other good conducting material and closed at the lower end as indicated at 28. This tube is caused to have a tight fit at its upper end with the neck of the fitting, it being illustrated as having a driving fit with the inner wall portion 29 of the fitting neck. The tube is preferably further provided with a beveled flange 30 adapted to seat on the beveled seat 26. The tube 27 is preferably so shaped as to conform quite closely to the bulb 15, any slight space between the bulb and tube being preferably filled with a filling of graphite and oil or other suitable material. The bulb 15 is illustrated as having at its upper end a collar 31 with a beveled lower face 32 adapted to seat on the flange 30 at the upper end of the tube. The bulb is secured in position in any suitable manner, as by means of the nut 33, which screws into the threaded bore in the neck and forces the collar of the bulb down against the flange of the tube, thus forming an additional means for preventing any leakage. The tube itself, however, is preferably fitted so tightly in the neck of the fitting that leakage cannot take place, this being of advantage as it permits the bulb to be taken out for repair or for any other reason without opening up the cooling system or permitting escape of the cooling liquid therefrom.

The body portion 20 of the fitting is preferably made of larger cross section than that of the tubular sections 21 so that although partially obstructed by the casing 27, its effective cross sectional area shall be not less than that of the return pipe. This permits the cooling water to circulate through the fitting and around the tubular casing or pocket 27 without being retarded in such a way as to interfere with the free circulation of the cooling liquid and consequent proper cooling of the engine.

Fig. 1, in addition to illustrating the application of the fitting disclosed, also shows a modification of my invention in which a well or casing for receiving the temperature responsive element is formed directly in the cylinder casting. As illustrated in this figure, the tubular depression or well 40 is cast in the top wall of the return manifold which, in the present instance, is formed as an integral part of the cylinder block. The bulb 15 is introduced into this well, being surrounded by a filling of graphite and oil or the like, if desired, and is held in position by a cover plate 41 secured by cap screws 42 or other suitable means. By casting the tubular depression in the cylinder casing itself, the utmost simplicity of manufacture is attained and all danger of leakage is eliminated. There is furthermore no danger of cracking the casing as may occur due to the modification of internal stresses which might result from boring a hole in the casting.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

Having thus described my invention, I claim:—

1. In means for indicating the thermal condition of the internal combustion engine of a motor vehicle, said engine having a water circulation cooling system including cylinder jackets, a radiator and a return pipe for conducting the heated water from the cylinder jackets to the radiator, the combination with the return pipe, of an indicating instrument mounted on the vehicle dash, a flexible tube leading from said instrument, a fluid filled bulb attached to said flexible tube, and a fitting introduced into said return pipe, said fitting comprising a body portion having a tubular extension at each side thereof, of substantially the same diameter as the return pipe, flexible hose sections connecting said tubular extensions with the adjacent portions of the return pipe, said fitting having a neck projecting from the body portion thereof and having a thin walled drawn metal tubular casing fitted in said neck and extending into the body portion of the fitting, said tubular casing being shaped to conform substantially to the bulb of the instrument, and means for clamping said bulb to said fitting and within said tubular casing.

2. A fitting for the purposes set forth, comprising a hollow body portion, a tubular extension at each side thereof, and a neck projecting laterally from the body portion, said neck having a portion of smooth bore and outside thereof a portion of a larger bore, said larger bore being internally threaded, and a thin walled metal tube fitting tightly in said smooth bore portion and extending into the body portion of the fitting, said tube being closed at its inner end.

3. The combination with a fitting of the character described, comprising a body portion having tubular extensions at opposite sides thereof, and having a laterally extending neck formed with a smooth bore portion having a shoulder at the outer end thereof, said fitting having a closed ended thin walled tube mounted therein, and fitting closely within the smooth bore of the fitting neck and having an outwardly turned flange bearing on the shoulder of said neck, of a bulb fitting in said tube and having a collar adapted to bear upon said outwardly turned flange, and clamping means engaging said collar for securing the bulb in position within said tube.

4. A fitting for the purposes set forth comprising a hollow body portion having alined cylindrical tubular extensions at opposite sides thereof, and means forming a pocket or well for the reception of a temperature-responsive element, said pocket or well extending transversely across the body portion and being open to the outside for the reception of said temperature-responsive element, but being sealed with respect to the wall of the body portion so as to prevent leakage, the cross sectional area of that part of the body portion into which said pocket or well extends being greater than the cross section of the tubular extensions.

5. A fitting of the character described having tubular portions for engagement with the flexible hose sections of a pipe of an engine cooling system and having a portion between said tubular extensions provided with a laterally opening bore and a thin walled tube fitting in said bore and extending into the interior of the fitting, said tube being closed at its inner end and open at its outer end.

6. In means for indicating the thermal condition of an internal combustion vehicle propelling engine having a water circulation cooling system, the combination with the cooling system of means forming a well or pocket having a wall of good conducting material extending into the water space of said system, and sealed with respect to the wall of that part of the system into which it is introduced so as to prevent leakage from the cooling system, a temperature responsive element mounted in said well or pocket, a gage responsive to temperature changes to which said temperature responsive element is subjected, said gage being located in position for observation by the driver of the vehicle, and an operative connection between said temperature responsive element and said gage.

HERMAN SCHLAICH.